(12) United States Patent
Kuroda et al.

(10) Patent No.: US 6,256,450 B1
(45) Date of Patent: Jul. 3, 2001

(54) PROGRESSIVE SCANNED SIGNAL PROCESSING APPARATUS

(75) Inventors: Tokuji Kuroda, Ibaraki; Tatsushi Bannai, Sakai, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/990,186

(22) Filed: Dec. 12, 1997

(30) Foreign Application Priority Data

Dec. 16, 1996 (JP) .................................................. 8-334354

(51) Int. Cl.$^7$ .............................. H04N 5/76; H04N 7/01
(52) U.S. Cl. ......................... 386/46; 386/131; 348/441; 348/446; 348/448
(58) Field of Search .................................. 386/1, 37, 40, 386/46, 131, 123, 124; 348/441, 446, 448; H04N 7/01, 5/76, 9/79

(56) References Cited

U.S. PATENT DOCUMENTS

| | | | |
|---|---|---|---|
| 5,305,104 | * 4/1994 | Jensen et al. ........................ | 348/473 |
| 5,337,089 | * 8/1994 | Fisch ................................... | 348/446 |
| 5,457,498 | 10/1995 | Hori et al. . | |
| 5,568,204 | * 10/1996 | Takamori ............................. | 348/584 |
| 5,631,706 | * 5/1997 | Tsunashima ......................... | 348/452 |

* cited by examiner

Primary Examiner—Thai Tran
(74) Attorney, Agent, or Firm—Parkhurst & Wendel, L.L.P.

(57) ABSTRACT

A progressive scanned signal processing apparatus for inputting progressive scanned image signals and processing them as 420P signals comprises a signal processing means and a storing means in order to prevent the qualities of images of color difference signals from being lowered. A delay time required for carrying out a whole signal processing is expressed by $2 \times N \times F$ (herein, $N>0$, N is an integer and F is time necessary for a period of one frame). Accordingly, the delay time necessary for the signal processing is expressed by the frames of even number, so that a main signal can be prevented from being replaced by a sub-signal.

7 Claims, 17 Drawing Sheets

PROGRESSIVE SCANNED SIGNAL PROCESSING APPARATUS

BACKGROUND OF THE INVENTION

1. Field of the Invention

The present invention relates to a signal processing apparatus for processing an image signal, such as a switcher, a DVE, or a device for recording or reproducing an image signal, for instance, a device for processing, recording, reproducing and transmitting an image signal which is applicable to a digital VTR.

2. Description of the Prior Art

In recent years, new broadcasting systems such as an EDTV 2 system or an HDTV system have been developed and the broadcasting has been started. However, in the EDTV 2 system, although private or exclusive cameras or VTRs thereof have been already commercialized, exclusive or private switchers or editing devices have not been yet brought to market.

Initially, the EDTV 2 system will be briefly explained hereinbelow.

The EDTV 2 system is based on progressive scanning signals (refereed to as progressive signals, hereinafter) which are different from interlace scanning signals (referred to as interlace signals, hereinafter) of a current system. FIG. 15 is a schematic view of the interlace signals and the progressive signals.

Referring to FIG. 15, the interlace signal system is constituted of 30 image data for one second and one image has 525 scanning lines. The scanning lines of one image data including the 525 scanning lines are interlace-scanned one by one. Thus, in the interlace system, the 30 image data is transmitted by 262.5 scanning lines so that it is transmitted as 60 image data for one second.

On the other hand, the progressive signal system is constituted of 60 image data for one second. One of the 60 image data comprises 525 scanning lines which are not interlace scanned.

The progressive signal composed of the 525 scanning lines per image 1 plane is digitized in the form of 8:4:4 of a sampling frequency two times as high as that of what is called a 4:2:2 signal which is specified by a Recommendation ITU-R. 601-3. The sampling frequency is two times as high as that of the 4:2:2 signal and a luminance signal has a frequency of 27 MHZ and a color difference signal has a frequency of 13.5 MHZ.

There has been developed a method in which such 8:4:4 signals are alternately divided every line into a main signal comprising one luminance signal and two color difference signals and a sub-signal comprising one luminance signal and two color difference signals so as to interpolate the main signal and they are transmitted. In the above mentioned method, the main signal and the sub-signal are not only interlace signals each having 525 scanning lines for one frame but also 4:2:2 signals. The above described main signal is added to the sub-signal and they are called a 4:2:2:4:2:2 signal.

For transmitting the above mentioned 8:4:4 signal or the 4:2:2:4:2:2 signals, there has been proposed a method that, for example, a vertical filter 49 as illustrated in FIG. 16 is vertically applied to the color difference signals of the 8:4:4 signal to control a band, by employing the visual characteristic of human beings who do not feel that the color difference signals having the quantity of information lower than those of the luminance signals are extremely deteriorated, and then, the color difference signal is transmitted for every line. In FIG. 16, numeric characters designate coefficients of a multiplier. Thus, the above mentioned 4:2:2:4:2:2 signal is transmitted as a 4:2:2:4:0:0 signal having the sub-signal including no color difference signal. The 4:2:2:4:0:0 signal is called a 420P signal. The 420P signal transmitting system has been disclosed as an SMPTE 294M standard. When the progressive signals are transmitted or recorded and reproduced, if the progressive signals are converted into the above described 420P signals, and the 420P signals are transmitted, or recorded and reproduced, the transmission band of the signals can be effectively reduced without visually deteriorating the image signals.

In the case of the 420P signals, image signals are divided into main signals and sub-signals respectively in a frame n and a frame (n+1), as can be seen in FIG. 17. The main signals and the sub-signals are arranged in the form of a grid in the frame n and the frame (n+1) in terms of time space or interval. Then, the color difference signals which are subjected to a band control by for instance, the vertical filter 49 shown in FIG. 16, are decimated for every one line, so that only the color difference signals in the main signal sides are transmitted and the color difference signals in the sub-signal sides are not transmitted. The color difference signals in the sub-signal sides which are decimated in such a way can be reproduced by, for example, applying an interpolating filter 50 to the main signals, as shown in FIG. 18.

A recording and reproducing device or an editing device to which the above mentioned 420P signals can be directly inputted have not been yet brought to market. In a conventional recording and reproducing device, two 4:2:2 signals, in other word, what is called a 4:2:2:4:2:2 signal, have been inputted thereto, color difference signals thereof have been decimated by the vertical filter 49 (see FIG. 16), the obtained signals have been recorded and reproduced as a 420P signal and the color difference signals of a sub-signal side in the reproduced 420P signal have been subjected to an interpolating processing in the interpolating filter 50 (see FIG. 18), so that the obtained signals have been outputted as two 4:2:2 signals.

Further, in a conventional editing device, progressive scanning signals have been treated as two interlace signals, so that operations such as an editing operation, a synthesizing operation and so on have been carried out.

As a conventional recording and reproducing device for 420P signals, for example, a VTR, has been put to practical use, in which a signal processing adapter is combined with what is called a D5VTR disclosed in a PROPOSED SMPTE STANDARD for Digital Video Recording ½-in Type D-5 Component Format 525/60 and 625/50 (SMPTE 279M, SMPTE, Journal, May 1995). According to the above described 3 conventional recording and reproducing device, that is, the VTR, the 420P signals have been highly efficiently decoded so as to further reduce a signal band and the signals have been recorded on the D5VTR capable of recording and reproducing the present 4:2:2 signals.

Now, an explanation will be given to a conventional system or method for a signal processing.

FIG. 19 is a block diagram showing an example of a signal processing part of the D5VTR system for recording and reproducing, for instance, the TV signals of an EDTV 2 system.

In FIG. 19, progressive scanned EDTV 2 signals are inputted. An input signal 51 is composed of two interlace signals. Color difference signals in a sub-signal side are decimated by a color signal decimating means 52. A recording signal processing means 53 carries out a highly efficient decoding processing for images and an interleaving processing for preventing the error propagation of images by using a first storing means 54. At this time, the delay of one field is generated in the processing for interleaving two fields into those of the highly efficiently decoded signals of the images. A recording signal 55 outputted from the recording signal processing means 53 is recorded on a recording medium 56. A field termed herein means the field of the interlace signal and has a frequency of 60 Hz.

A reproduced signal 57 reproduced from the recording medium 56 is inputted to a reproduced signal processing means 58. In the reproduced signal processing means 58, an error correcting processing, a deinterleaving processing and a highly efficient decoding processing are conducted by using a second storing means 59. In the reproduced signal processing means 58, the delay of two fields is generated in the deinterleaving processing. Further, the delay of two fields is generated also in the highly efficiently decoding processing. A delay time necessary for the deinterleaving processing may be one field at a minimum. However, usually, two fields are required for the delay time to provide a surplus in a slow processing or the like. Then, the color difference signals in the sub-signal side of the 420P signal are interpolated by a color difference signal interpolating means 60 so that the signal is outputted as two 4:2:2 signals 61.

However, according to the conventional signal processing method, all the delay time required for the signal recording processing and the signal reproducing processing reaches a frame expressed by odd numbers. The 420P signal has a construction as illustrated in FIG. 17. The sampling position of the main signal is different from that of the sub-signal between a frame n and a frame (n+1). Therefore, when the total of delay time reaches time indicated by the frame expressed by odd numbers, the sub-signals are outputted to the sampling positions of the main signals located in the frame represented by even numbers and the main signals are outputted to the sampling positions of the sub-signals in order to maintain the frame structure of images.

In addition, also in the frame of odd numbers, the sub-signals are outputted to the sampling positions of the main signals, and the main signals are outputted to the sampling positions of the sub-signals. As a result, the color difference signals in the sub-signal sides are formed in accordance with an interpolating processing from the main signals. Thus, when a whole delay time becomes time located in the frame expressed by odd numbers, the main signals are undesirably replaced by the sub-signals, so that the color difference signals in the sub-signal sides formed under the interpolation processing are disadvantageously outputted as the main signals.

When the above described signal processing is repeated, the color difference signals synthesized or composed by the interpolating processing are repeatedly subjected to a decimating processing and an interpolating processing. Thus, there has arisen a problem that the qualities of images of the color difference signals are degraded. Specifically stated, both the vertical filter 49 for a decimating processing and the interpolating filter 50 for an interpolating processing cannot realize an ideal filter because of the restriction in the number of taps. If a filtering processing is repeated, the qualities of images of the color difference signals will be undesirably lowered.

When an actual studio system is taken into consideration, the system in which VTRS, switchers and so on are connected in series and in a multiple stage is employed. Therefore, since the color difference signals of an image signal passing through the equipments and devices in a multiple stage with whole delay times located in the frames expressed by odd numbers are repeatedly decimated and interpolated, the qualities of images of the color difference signals have been inconveniently obviously degraded.

SUMMARY OF THE INVENTION

The present invention has been proposed in order to overcome the above mentioned problems encountered in the conventional system. It is an object of the present invention to provide a signal processor into which progressive scanned image signals are inputted and processed as 420P signals without lowering the qualities of images of color difference signals.

For achieving the above described object, according to a first aspect of the present invention, there is provided a progressive scanned signal processing apparatus in which progressive scanned image signals or image signals obtained by vertically decimating color difference signals of the progressive scanned image signals for every one line (hereinafter, referred to as 420P signals) are taken as inputs and processed based on a 420P signal form, the progressive scanned signal processing apparatus comprising: a signal processing means for carrying out a signal processing which needs time of 2×N×F (herein, N>0, N is an integer and F represents time corresponding to a period of one frame of an image signal).

According to a second aspect of the present invention, there is provided a progressive scanned signal processing apparatus further comprising: a color difference signal decimating means provided in the input side of the signal processing means for vertically decimating the color difference signals of the progressive scanned image signals for every one line, wherein the total of the time required for a decimating processing by the color difference signal decimating means and the time required for the signal processing by the signal processing means is 2×N×F (herein, N>0, N is an integer and F represents time corresponding to a period of one frame of an image signal).

Further, according to a third aspect of the present invention, there is provided a progressive scanned signal processing apparatus further comprising: a color difference signal interpolating means provided in the output side of the signal processing means for interpolating the decimated color difference signals, wherein the total of the time required for the signal processing by the signal processing means and the time required for the interpolating processing by the color difference signal interpolating means is 2×N×F (herein, N>0, N is an integer and F represents time corresponding to a period of one frame of an image signal).

Still further, according to a fourth aspect of the present invention, there is provided a progressive scanned signal processing apparatus further comprising: a color difference signal decimating means provided in the input side of the signal processing means for vertically decimating the color difference signals of the progressive scanned image signals for every one line; and a color difference signal interpolating means provided in the output side of the signal processing means for interpolating the decimated color difference signals; wherein the total of the time required for the decimating processing by the color difference signal decimating means, the time required for the signal processing by the signal processing means and the time required for the interpolating processing by the color difference signal interpolating means is 2×N×F (herein, N>0, N is an integer and F represents time corresponding to a period of one frame of an image signal).

Still further, according to a fifth aspect of the present invention, there is provided a progressive scanned signal processing apparatus in which progressive scanned image signals or image signals obtained by vertically decimating color difference signals of the progressive scanned image signals for every one line (hereinafter, referred to as 420P signals) are taken as inputs, and recorded and reproduced as the 420P signals, the progressive scanned signal processing apparatus comprising: a leading reproducing means for reproducing data at a position preceding in terms of time; and a recording means for simultaneously receiving the reproduced signal as an input signal again and recording the reproduced signal, wherein the total of a delay time due to the difference in physical position between the recording means and the leading reproducing means and a time required for the signal reproducing processing and the signal recording processing is 2×N×F (herein, N>0, N is an integer and F represents time required for a period of one frame).

In addition, according to a sixth aspect of the present invention, there is provided a progressive scanned signal processing apparatus in which progressive scanned image signals or image signals obtained by vertically decimating color difference signals of the progressive scanned image signals for every one line (hereinafter, referred to as 420P signals) are taken as inputs, and recorded and reproduced as the 420P signals, the progressive scanned signal processing apparatus comprising: a recording means for recording the input signals and a reproducing means for reproducing the input signals at the same time, wherein the total of a delay time due to the difference in physical position between the recording means and the reproducing means and the time required for the signal recording processing and the signal reproducing processing is 2×N×F (N>0, N is an integer and F represents time required for one frame).

According to the above described progressive scanned signal processing apparatus of the present invention, since the time necessary for a signal processing reaches time represented by the frame of even numbers, the main signals are not replaced by the sub-signals. Thus, even when a decimating processing and an interpolating processing are repeatedly applied to the color difference signals, an effect that the image qualities of the color difference signals are not deteriorated can be obtained.

Additionally, according to a seventh aspect of the present invention, there is provided a progressive scanned signal processing apparatus in which image signals (referred to as 420P signals, hereinafter) obtained by vertically decimating progressive scanned image signals or the color difference signals of the progressive scanned image signals for every one line are taken as inputs, and the input signals are processed based on a 420P signal form, the progressive scanned signal processing apparatus comprising: a signal processing means to which the image signals are inputted and from which the image signals are outputted, the image signals outputted from the signal processing means being synchronized with those inputted to the signal processing means so as to be delayed by even numbers of frames relative to the image signals inputted to the signal processing means.

According to the above described progressive scanned signal processing apparatus of the present invention, since the image signals outputted from the signal processing means are delayed by even numbers of frames from those inputted to the signal processing means, the main signals are not replaced by the sub-signals. Thus, even when the decimating processing and the interpolating processing for the color difference signals are repeated, the qualities of images of the color difference signals are effectively prevented from being lowered.

BRIEF DESCRIPTION OF THE DRAWINGS

The present invention will now be described, by way of examples, with reference to the accompanying drawings, in which:

FIG. 15 is a view showing the difference between progressive signals and interlace signals in a conventional EDTV 2 system or the like;

FIG. 16 is a view showing the constitution of a prefilter for controlling the frequency band of color difference signals used for the conventional EDTV 2 system or the like;

FIG. 17 shows the arrangement of progressive scanning signals in terms of time space or time interval which is employed for the conventional EDTV 2 system or the like;

FIG. 18 is a block diagram showing the constitution of an interpolating filter of color difference signals used for the conventional EDTV 2 system or the like; and FIG. 19 is a block diagram showing the constitution of a signal processing apparatus in the conventional EDTV 2 system or the like.

DETAILED DESCRIPTION OF THE PREFERRED EMBODIMENTS

Now, an explanation will be given to a first embodiment of the present invention.

Figure 1:
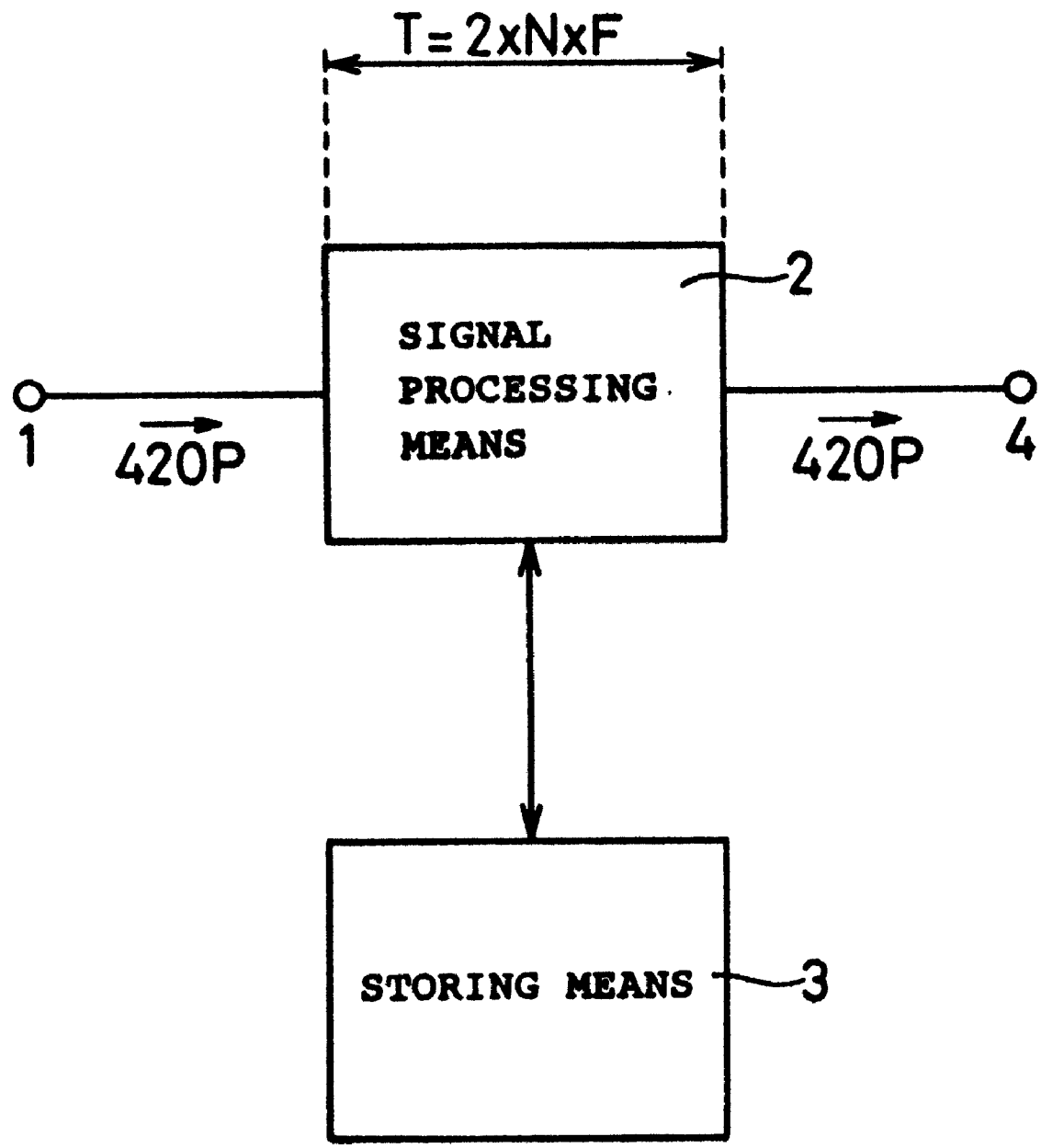
FIG. 1 is a block diagram showing the constitution of a progressive scanned signal processing apparatus according to a first embodiment of the present invention.

FIG. 1 is a block diagram showing the construction of a signal processing apparatus applied to a device for processing progressive scanned image signals, such as an editing device, a switcher, a VTR and so on.

Referring to FIG. 1, an image signal in a 420P form is inputted to an input signal 1. A signal processing means 2 processes the input signal 1 by using a storing means 3 and outputs an output signal 4 in the 420P form. At this time, it is assumed that a whole delay time T is expressed by T=2×N×F (herein, N>0, N is an integer and F indicates time equivalent to a period of one frame of an image).

As mentioned above, in the case of the output signal 4 in the form of 420P, if the whole delay time T becomes frames expressed by even numbers, taking it into consideration that color difference signals are subjected to an interpolating processing by a device in a succeeding stage, the quality of image is not deteriorated because a main signal is not replaced by a sub-signal.

Next, a second embodiment of the present invention will be described below.

Figure 2:
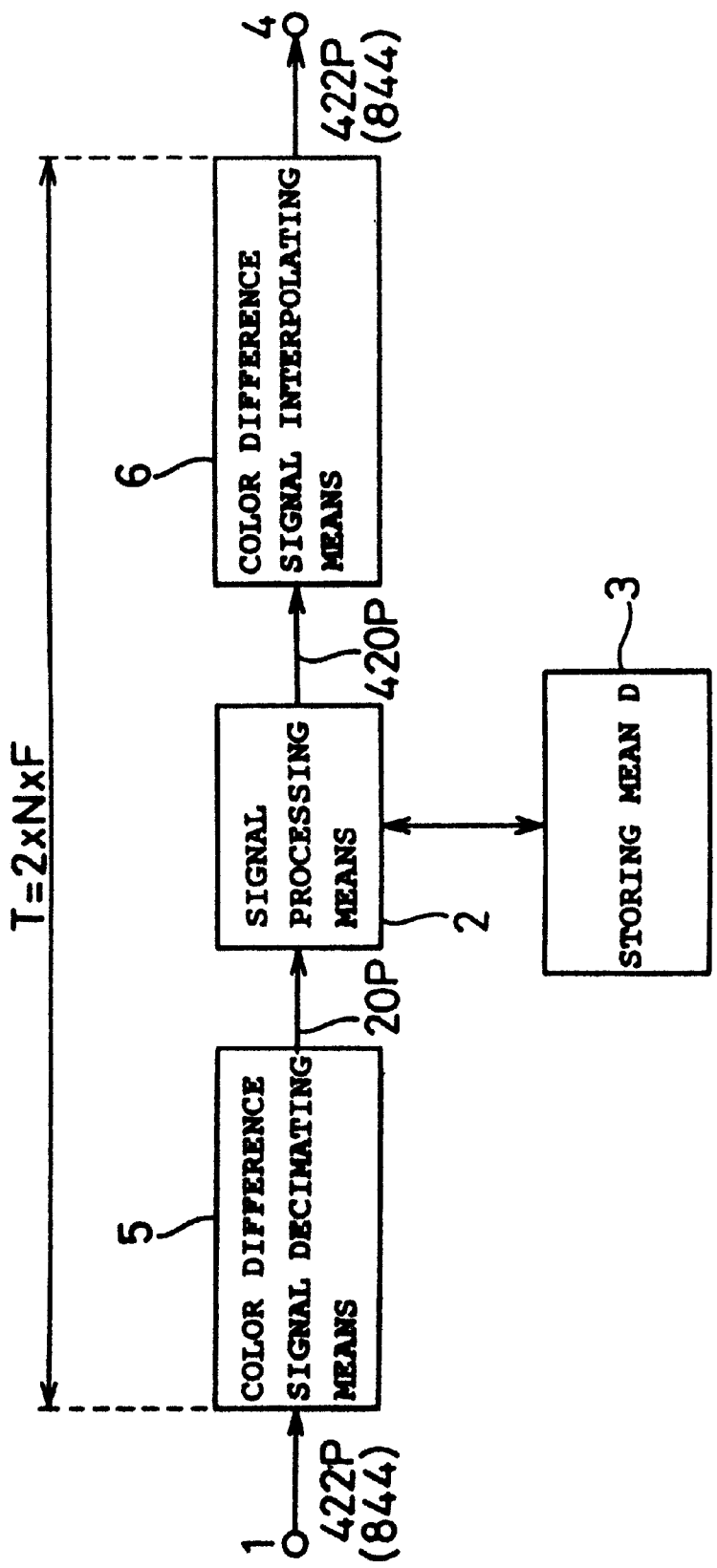
FIG. 2 is a block diagram showing the constitution of a progressive scanned signal processing apparatus according to a second embodiment of the present invention.
Figure 16:
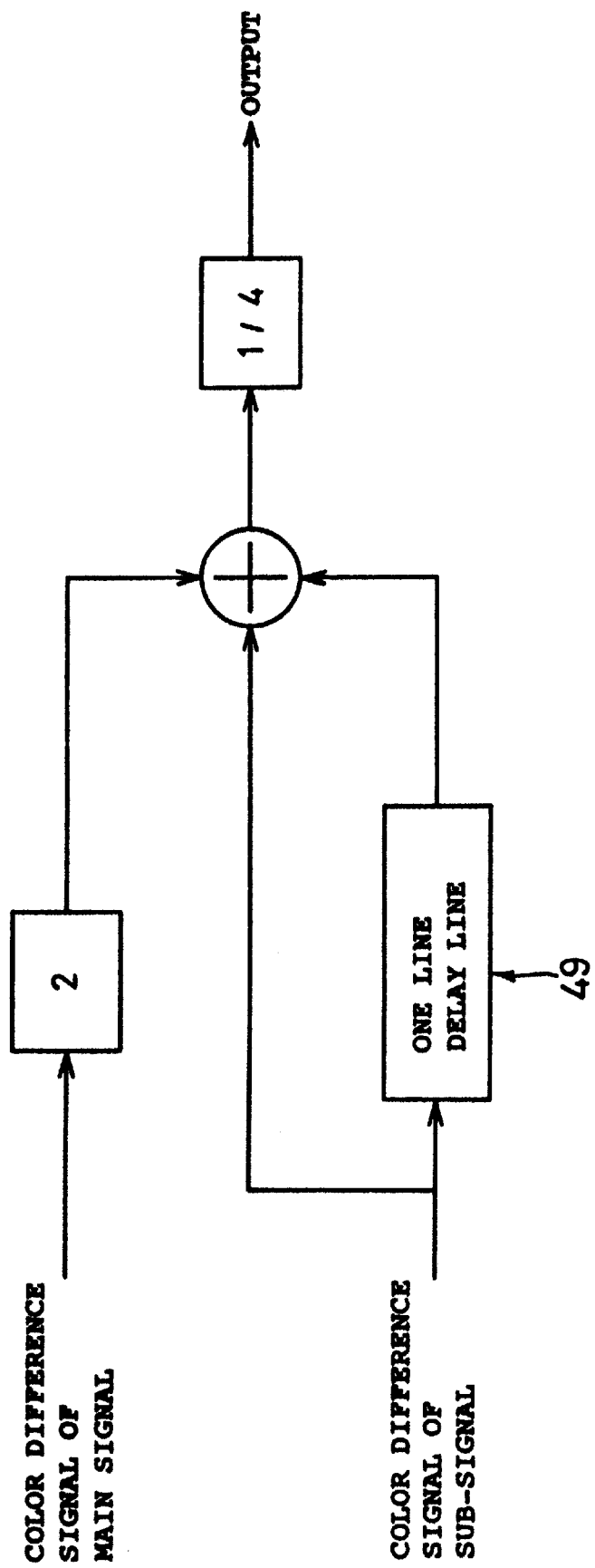
Figure 17:
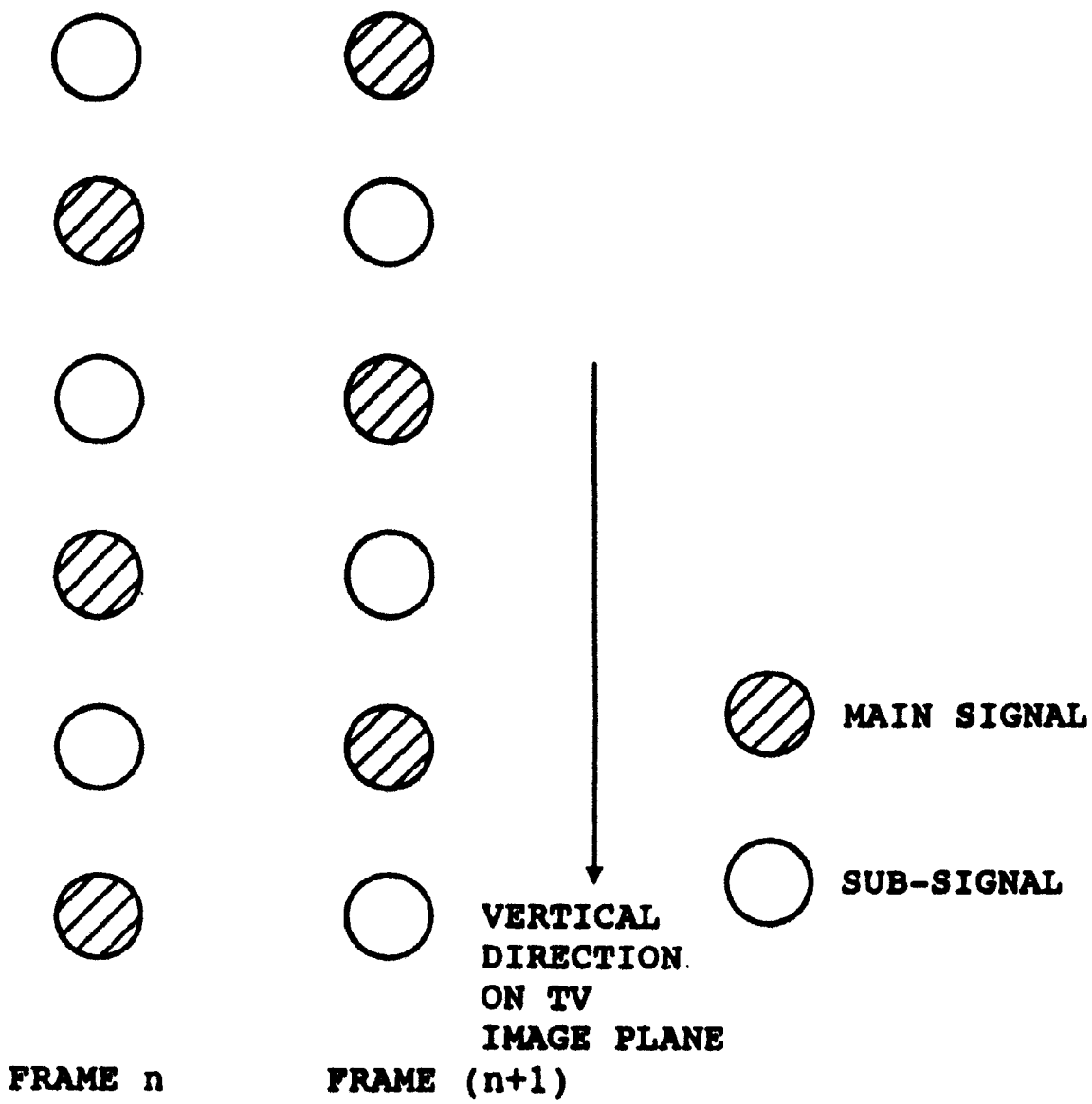

FIG. 2 is a block diagram showing the constitution of a signal processing apparatus according to the second embodiment of the present invention. In FIG. 2, a color difference signal decimating means 5 is provided in the input side of the signal processing means 2. A color difference signal interpolating means 6 is provided in the output side of the signal processing means 2. As the color difference signal decimating means 5, a prefilter 49 (vertical filter) for controlling a frequency band as illustrated in FIG. 16 is used. The prefilter serves to decimate the color difference signals of the input signal 1 in the form of 8:4:4 or in the form of 4:2:2:4:2:2 (422P form) and converts the signal in. the 8:4:4 form or 422P form into the signal in the 420P form.

Figure 18:
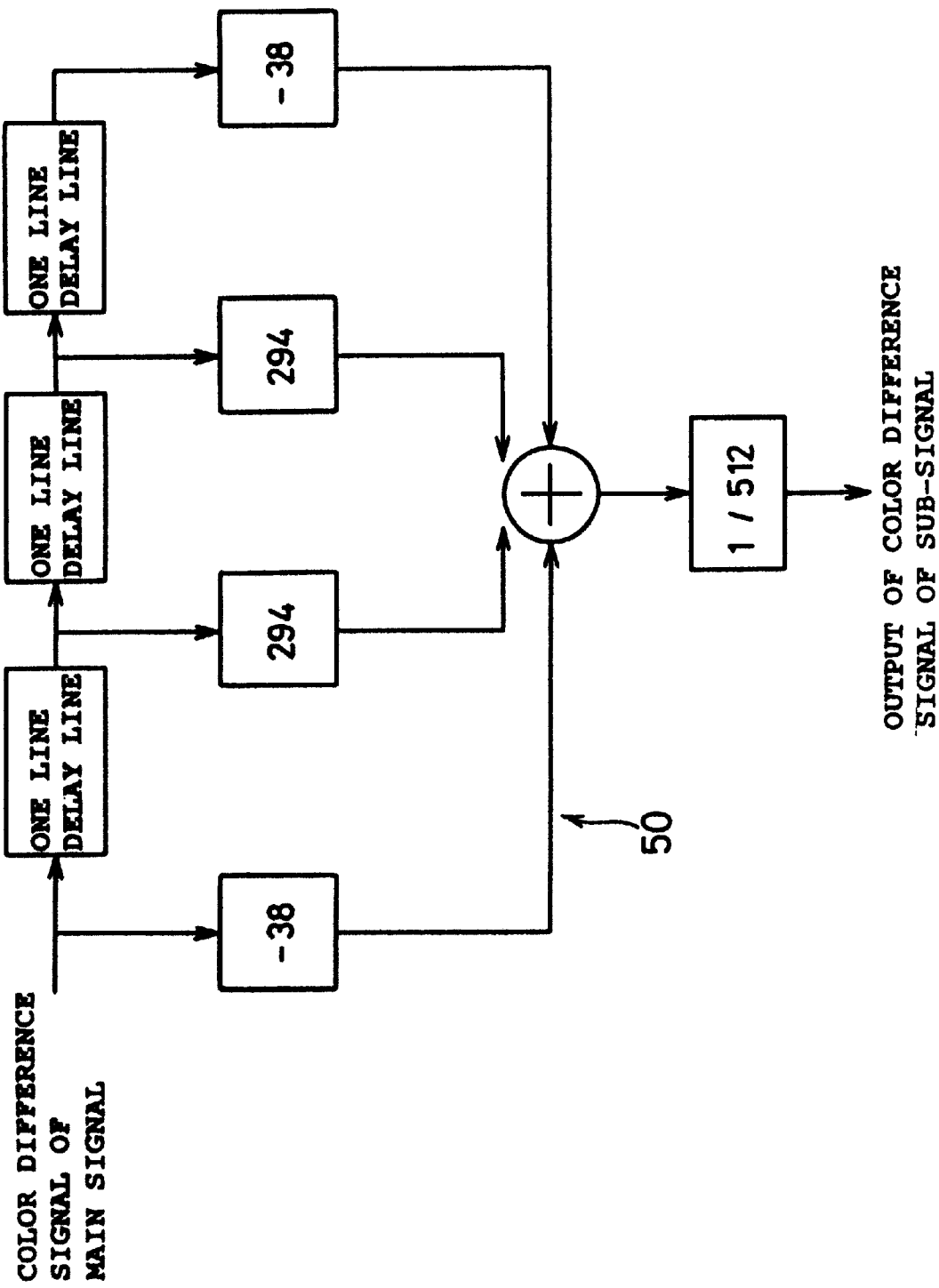
Figure 19:
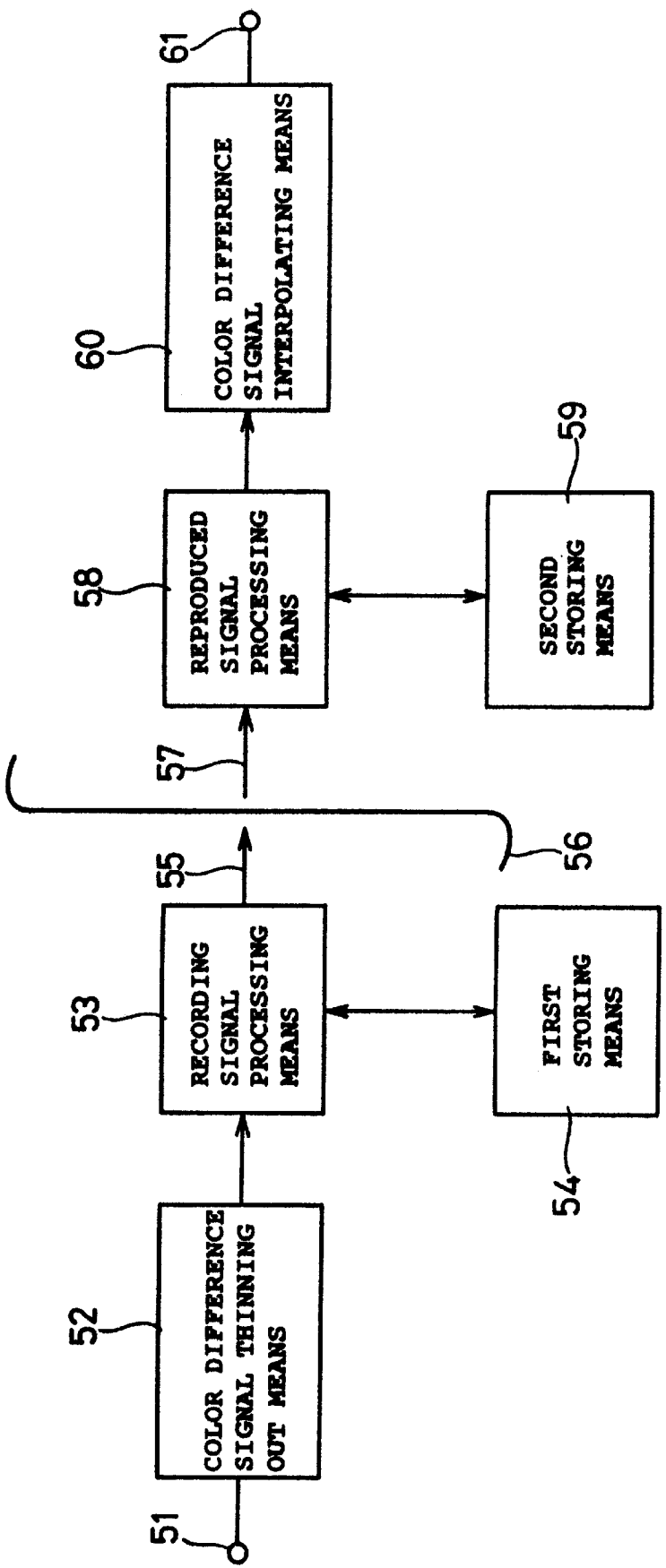

As the color difference signal interpolating means 6, an interpolating filter 50 illustrated in FIG. 18 is employed. The interpolating filter 50 serves to interpolate the color difference signals in the sub-signal side of the output signal 4 in the form of 420P which is outputted from the signal processing means 2 and converts the signal in the form of 420P into the signal in the form of 4:2:2:4:2:2 (422P form) or in the form of 8:4:4.

Further, it is assumed that the total of time necessary for a decimating processing by the color difference signal decimating means 5, time necessary for a signal processing by the signal processing means 2 and time necessary for an interpolating processing by the color difference signal interpolarting means 6 is 2×N×F (herein, N>0, N is an integer and F represents time corresponding to a period of one frame of an image signal).

In this case, when the input signal 1 is in the form of 4:2:2:4:2:2 or in the form of 8:4:4, the color difference signals of the input signal 1 are decimated by the color difference signal decimating means 5 for every one line so that the input signal 1 is converted into a signal in the from of 4:2:2:4:2:2 or in the form of 8:4:4 in which the color difference signals are not included in the sub-signal and inputted to the signal processing means 2.

Then, the image signal subjected to the signal processing by the signal processing means 2 is outputted as the signal in the form of 420P form from the signal processing means 2. Then, the color difference signals in the sub-signal 12 side of the image signal are interpolated by the color difference signal interpolating means 6 so that the image signal is converted into an output signal in the form of 4:2:2:4:2:2 or in the form of 8:4:4 and outputted.

At this time, assuming that the total of time required for the decimating processing by the color difference signal decimating means 5, time required for the signal processing by the signal processing means 2 and time required for the interpolating processing by the color difference signal interpolating means 6 is 2×N×F (herein, N>0, N is an integer and F is time corresponding to a period of one frame of an image signal), the color difference signals of the sub-signal are synthesized or composed from the color difference signals of the main signal without fail. More specifically, the color difference signal interpolating means 6 has tap coefficients as shown in the interpolaitng filter 50 in FIG. 18. In this interpolating filter 50, the color difference signals in the main signal side are retained as they are in order to form the color difference signals of the sub-signal side from the color difference signals of the main signal side. Accordingly, the frequency band of the color difference signals is determined only by the frequency characteristic of the prefilter 49 (vertical filter) for controlling a front end band as seen in FIG. 16. Thus, even when the signal processing apparatuss are connected in a multiple stage, the quality of the image is not degraded.

Figure 3:
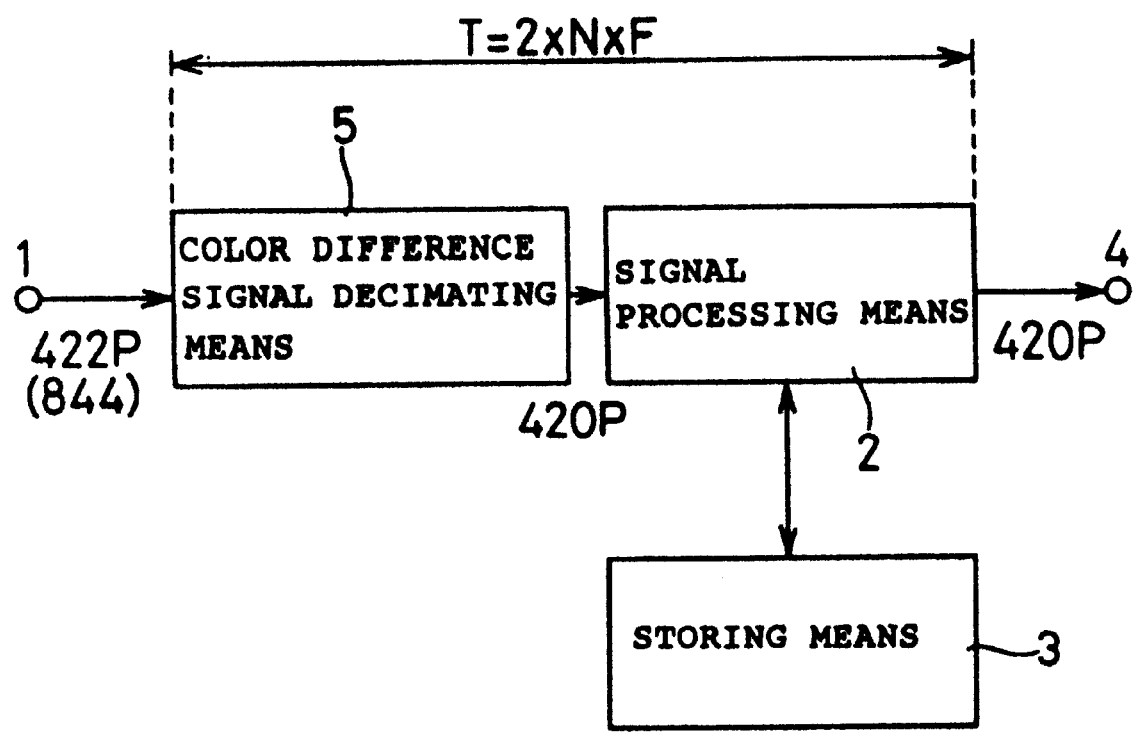
FIG. 3 is a block diagram showing the constitution of a progressive scanned signal processing apparatus according to a third embodiment of the present invention.

Although, in the above second embodiment, the color difference signal decimating means 5 is provided in the input side of the signal processing means 2 and the color difference signal interpolating means 6 is provided in the output side thereof, it is to be noted that a progressive scanned signal processing apparatus of a third embodiment according to the present invention illustrated in FIG. 3, may be employed. In the signal processing apparatus shown in FIG. 3, the color difference signal decimating means 5 is provided in the input side of the signal processing means 2 and the total of time required for a decimating processing by the color difference signal decimating means 5 and time required for a signal processing by the signal processing means 2 is set to 2×N×F (N>0, N is an integer and F is time corresponding to a period of one frame of an image signal).

Figure 4:
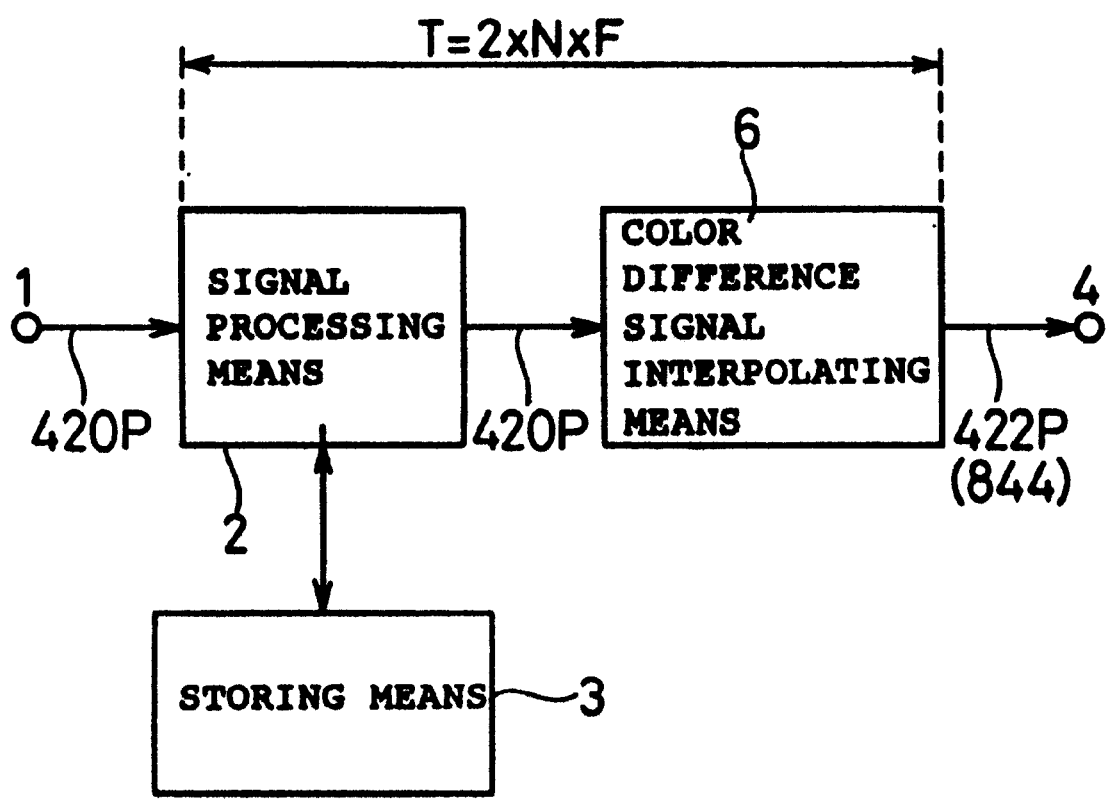
FIG. 4 is a block diagram showing the constitution of a progressive scanned signal processing apparatus according to a fourth embodiment of the present invention.

Further, as shown in FIG. 4, a progressive scanned signal processing apparatus of a fourth embodiment according to the present invention may be preferably employed. In the signal processing apparatus of the fourth embodiment, the color difference signal interpolating means 6 is arranged in the output side of the signal processing means 2. Then, the sum of time necessary for a signal processing by the signal processing means 2 and time necessary for an interpolating processing by the color difference signal interpolating means 6 is set to 2×N×F (N>0, N is an integer and F indicates time equivalent to a period of one frame of an image signal).

Now, a fifth embodiment of the present invention will be described by referring to FIGS. 5 to 7.

Figure 5:
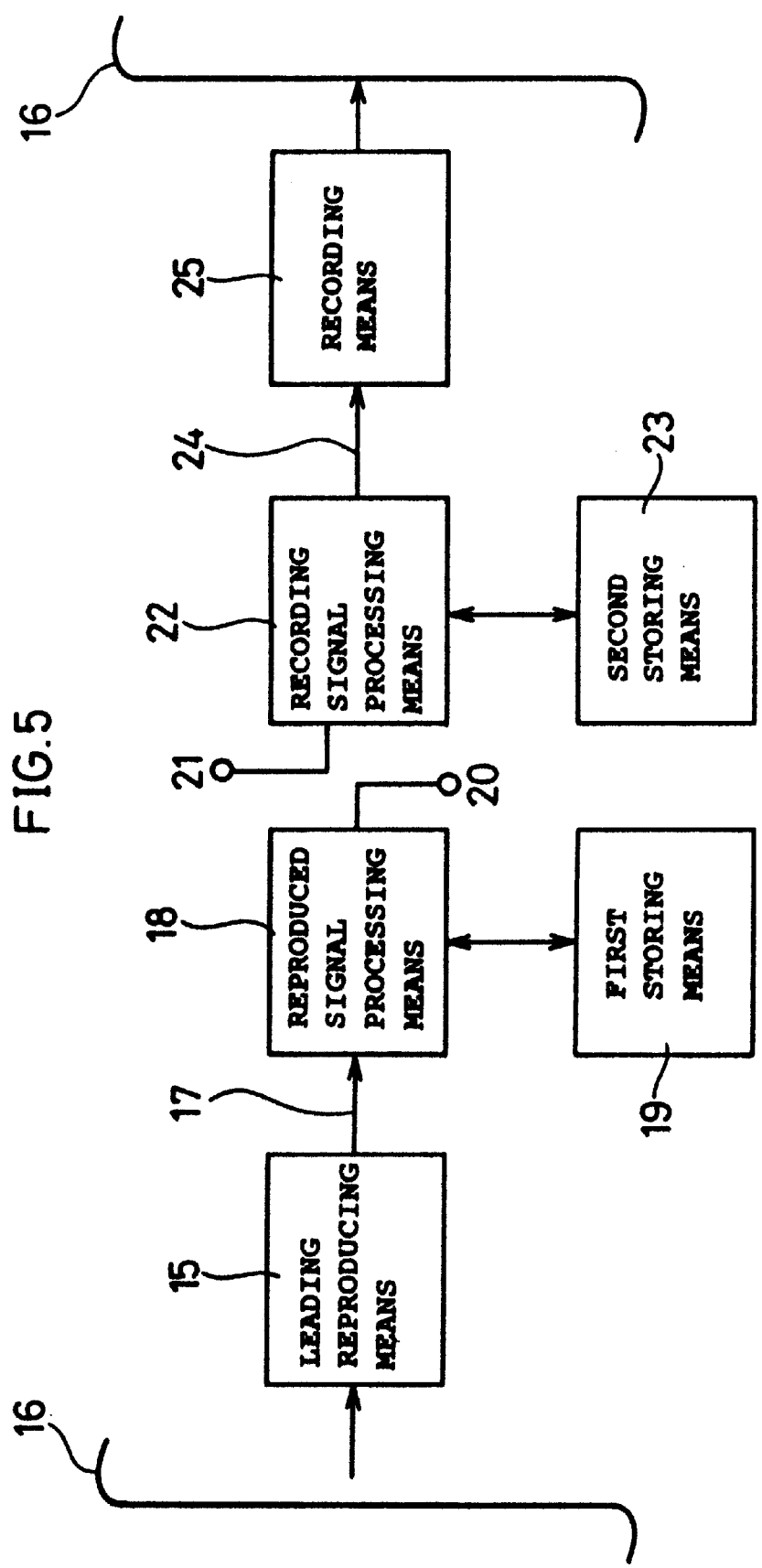
FIG. 5 is a block diagram showing the constitution of a progressive scanned signal processing apparatus according to a fifth embodiment of the present invention.

FIG. 5 is a block diagram illustrating the constitution of a progressive scanned signal processing apparatus according to the fifth embodiment of the present invention. As the signal processing apparatus, a digital VTR for recording and reproducing progressive scanned signals will be described hereinafter. In this instance, it is assumed that the progressive scanned signals are recorded in the form of 420P signal on a tape.

Figure 6:
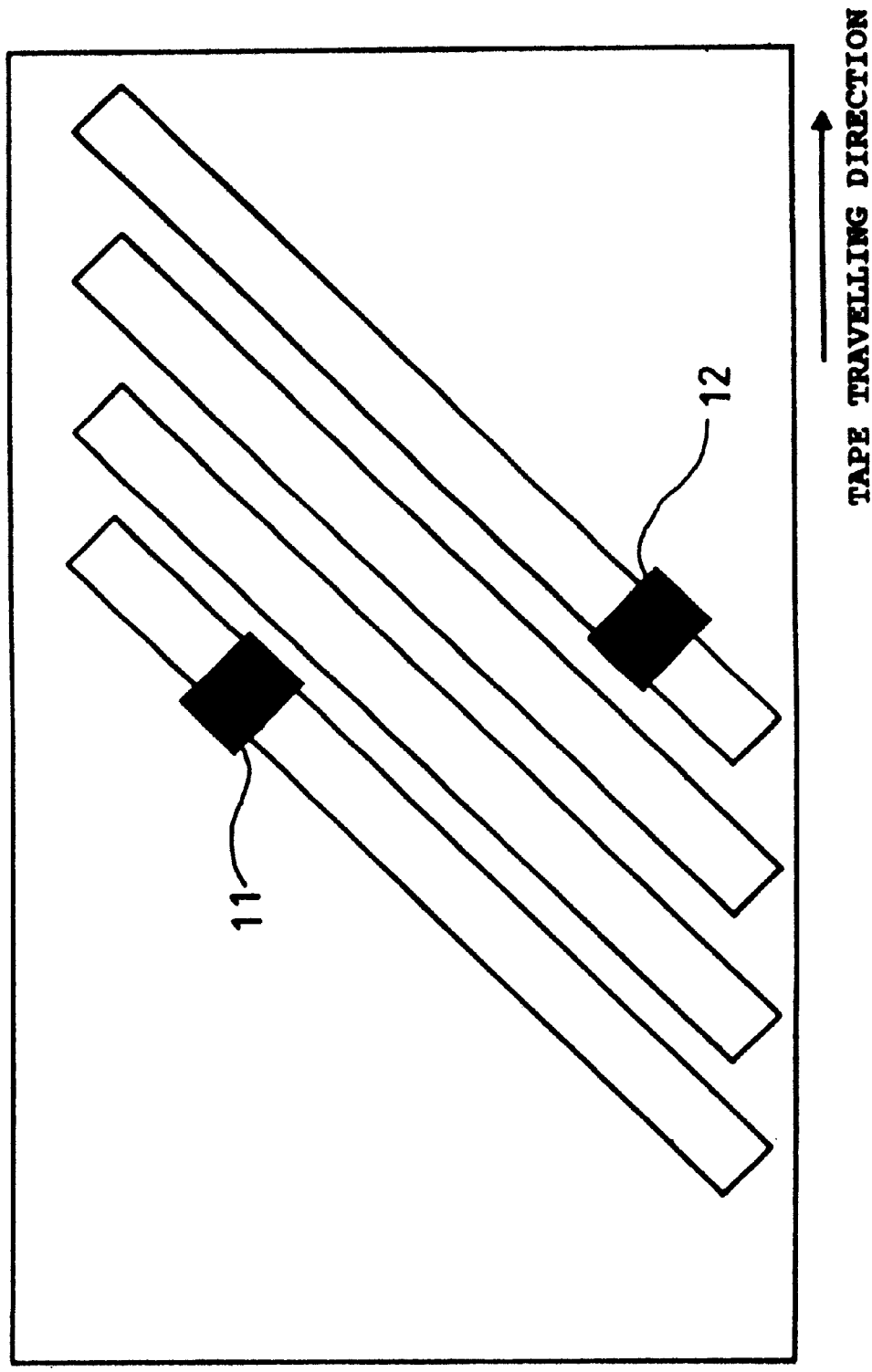
FIG. 6 is a view showing a track pattern of the signal processing apparatus of the fifth embodiment according to the present invention.

FIG. 6 shows one example of a track pattern on the tape of the digital VTR. Generally speaking, in the case of the digital VTR, data located at a leading position on the tape is preread, the preread data is subjected to a signal reproducing processing, and then, the reproduced signal is outputted outside of the VTR. After the signal is subjected to a processing outside, the processed signal is inputted again to the VTR and recorded again on the same position of the tape. Such a processing is referred to as a preread editing processing. In order to carry out the preread editing processing, as illustrated in FIG. 6, data located at a leading position is read out by a leading reproducing head 11 and the read data is recorded again on the same position by a recording head 12. As illustrated in FIG. 7, the leading reproducing heads 11 and the recording heads 12 are arranged at circumferentially regular intervals of 90° on a drum 13.

Figure 7:
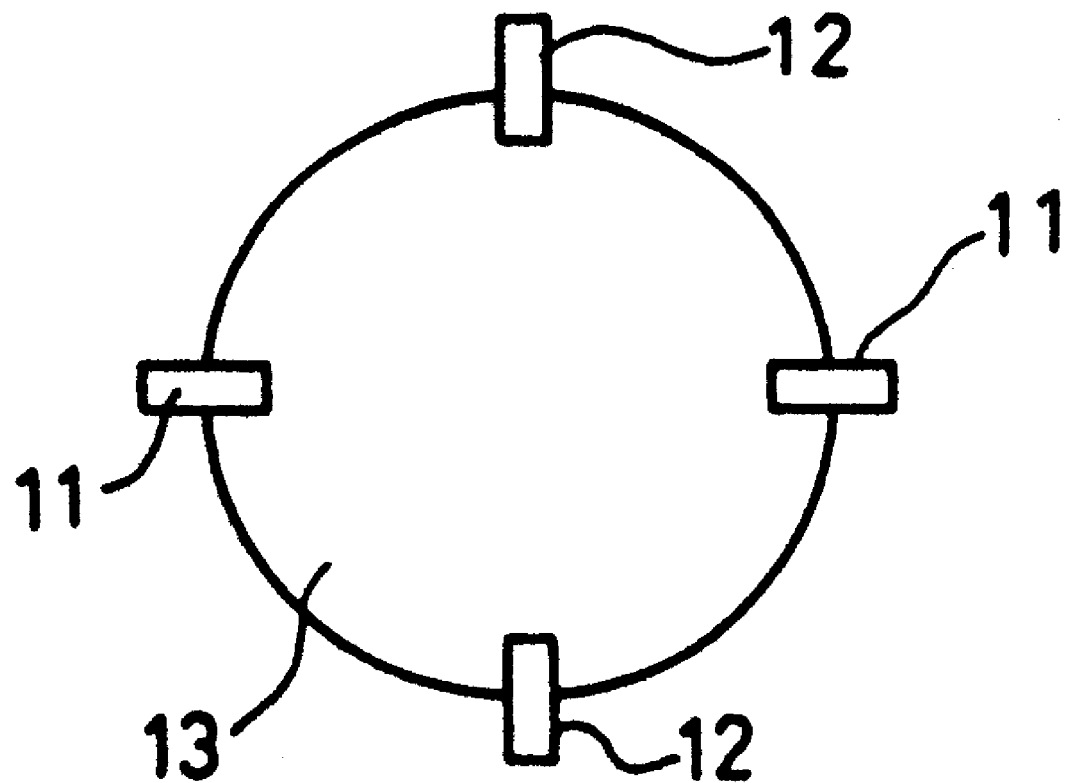
FIG. 7 is a view showing the arrangement of heads on a drum in the signal processing apparatus according to the fifth embodiment of the present invention.

In FIG. 5, a leading reproducing means 15 comprises, for example, the leading reproducing heads 11 or the like shown in FIG. 7 and serves to reproduce the data of a magnetic tape 16 as well as to preread a position preceding a track to be recorded as illustrated in FIG. 6. A leading reproduced signal 17 which is precedently reproduced in the leading reproducing means 15 is processed in a reproduced signal processing means 18. The reproduced signal processing means 18 carries out a reproduced signal processing by using a first image storing means 19. The reproduced signal processing includes, for example, an error correcting processing, a deinterleaving processing, a highly efficient decoding processing and so on. An output signal 20 outputted from the reproduced signal processing means 18 is subjected to any processing in an external part and inputted again to a VTR as an input signal 21 of the VTR. Then, a recording signal processing means 22 carries out processings of interleaving, adding of error corrected codes or the like by using a second image storing means 23. A recording signal 24 outputted from the recording signal processing means 22 is recorded on the magnetic tape 16 in an image recording means 25 comprising the recording heads 12 or the like as shown in FIG. 7.

In such a construction of the signal processing apparatus, it is assumed that the whole delay time T from the output of the leading reproducing means 15 to the input of the recording means 25 is expressed by $T=2\times N\times F$ (N>0, N is an integer and F is time corresponding to a period of one frame of an image signal). In the case of the progressive scanned image signals, the frequency of the period of one frame is 60 Hz. Since the recording head 12 is separated by 90° from the leading reproducing head 11 in the arrangement of the heads illustrated in FIG. 7, a delay time due to the difference in physical position for attachment between the recording head 12 and the leading reproducing head 11 is equivalent to time half as much as a head switch period. If a track pattern exhibits a pattern, for example, as illustrated in FIG. 6, it is assumed that the total of the delay time (that is, a half the head switch period) due to the difference in physical position for attachment between the recording head 12 and the leading reproducing head 11, a delay in the reproduced signal processing means 18 and a delay in the recording signal processing means 22, and a time required for the processing in the external part (that is, the delay between the output signal 20 and the input signal 21) is all the delay time T and T is expressed by $2\times N\times F$ (herein N>0, N is an integer and F is time equivalent to a period of one frame of an image signal).

As described above, since the main signal is not replaced by the sub-signal in the 420P signal which is reproduced and recorded again, the quality of the color difference signals is not lowered.

Next, with reference to FIGS. 8 to 10, a sixth embodiment of the present invention will be described below.

Figure 8:
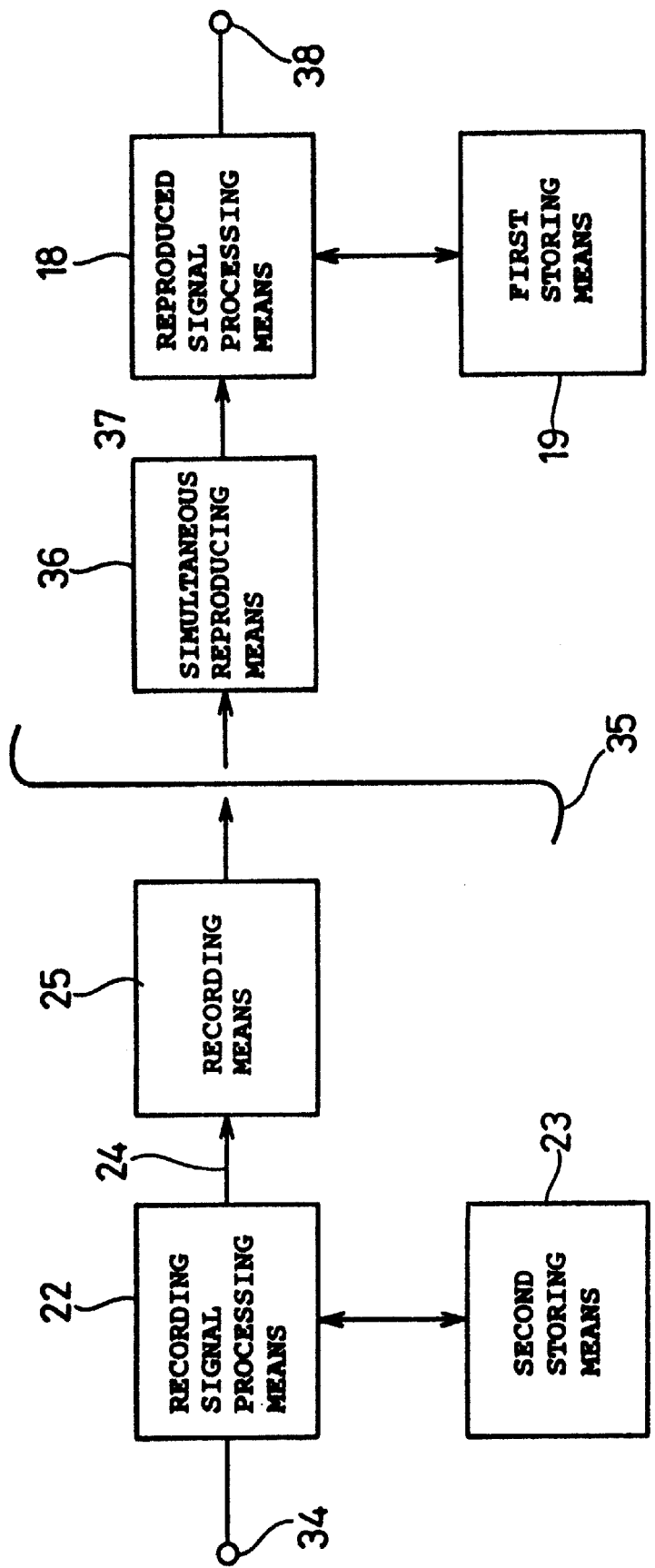
FIG. 8 is a block diagram showing the constitution of a progressive scanned signal processing apparatus according to a sixth embodiment of the present invention.

FIG. 8 is a block diagram showing the constitution of a progressive scanned signal processing apparatus according to the sixth embodiment of the present invention. An explanation will be given to a digital VTR for recording and reproducing progressive scanned signals as the signal processing apparatus. At this time, it is assumed that the progressive scanned signals are recorded on a tape in the form of 420P signals.

Figure 9:
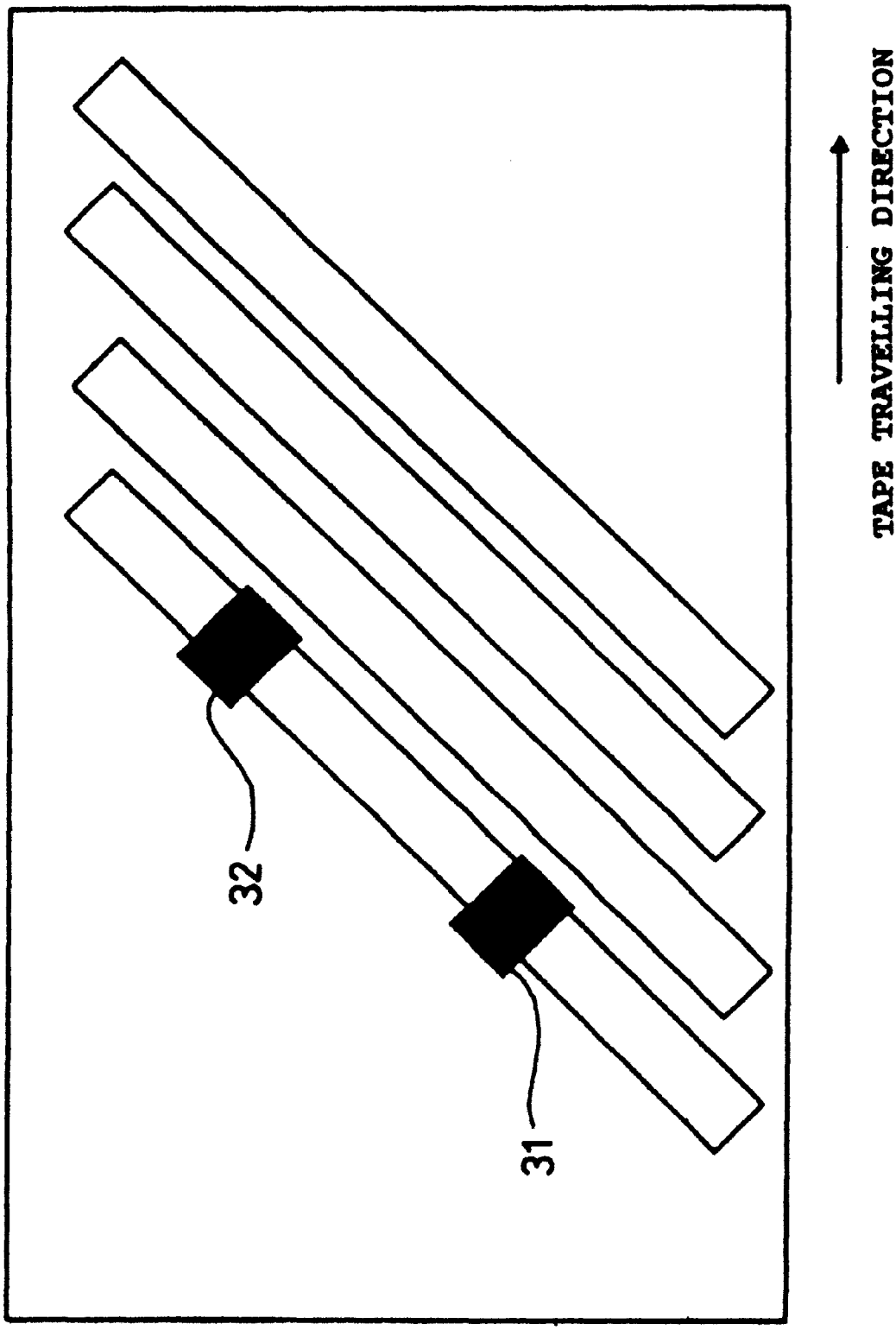
FIG. 9 is a view showing a track pattern of the signal processing apparatus according to the sixth embodiment of the present invention.
Figure 10:
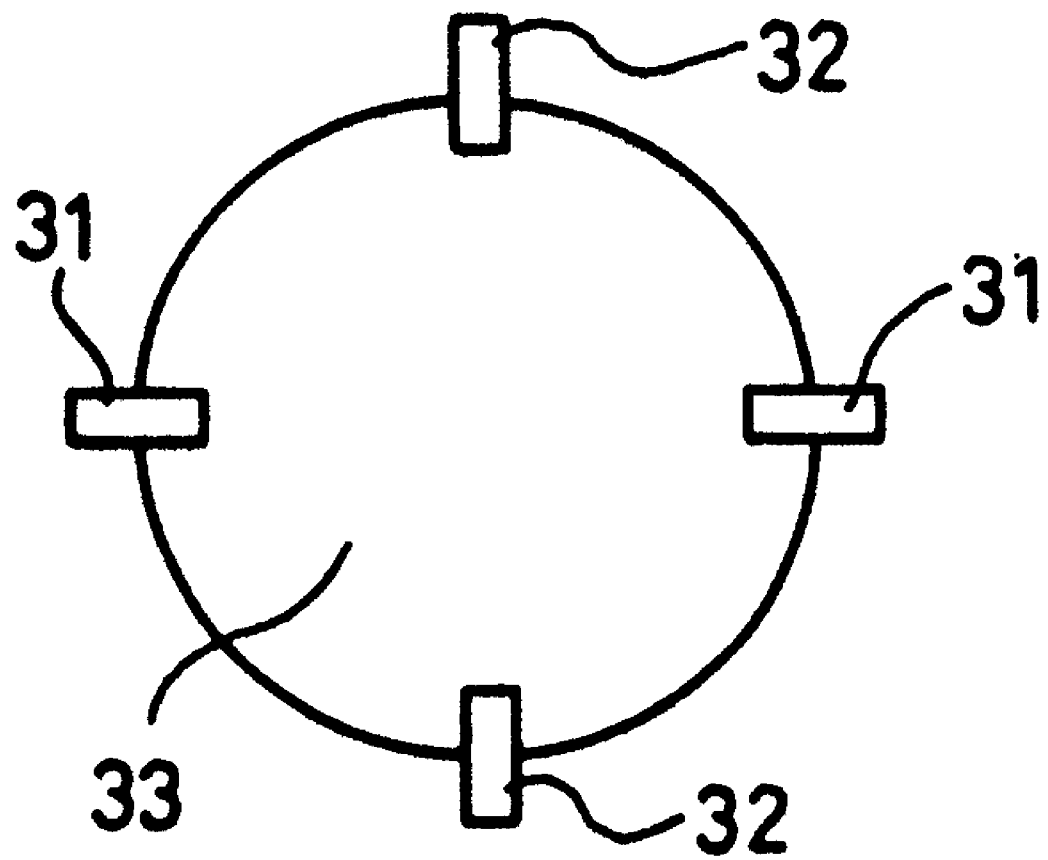
FIG. 10 is a view showing the arrangement of heads on a drum of the signal processing apparatus according to the sixth embodiment of the present invention.

FIG. 9 shows an example of a track pattern on the tape in the digital VTR. In the digital VTR, recorded data may be reproduced on the tape in order to recognize whether desired data is recorded or not. Such a processing is called a simultaneous reproduction. For carrying out the simultaneous reproduction, for example, as shown in FIG. 9, the data on a track the same as a track on which the data is recorded by a recording head 32 is read out by a simultaneous reproducing head 31 and outputted from the VTR. As illustrated in FIG. 10, the simultaneous reproducing heads 31 and the recording heads 32 are arranged on a drum 33 at circumferentially regular intervals, for example, 90°.

Further, as illustrated in FIG. 8, the progressive scanning signal is inputted to the VTR as an input signal 34. The recording signal processing means 22 carries out processings including an interleaving processing, an error correcting code adding processing or the like by using the second image storing means 23. The recording signal 24 outputted from the recording signal processing means 22 is recorded on a magnetic tape 35 by the image recording means 25 comprising the recording heads 32 or the like as shown in FIG. 10. In FIG. 8, a simultaneous reproducing means 36 comprises, for example, the simultaneous reproducing heads 31 shown in FIG. 10 or the like and reads out data on the track the same as that on which the data is recorded as illustrated in FIG. 9. A simultaneously reproduced signal 37 which is simultaneously reproduced from the magnetic tape 35 by the simultaneous reproducing means 36 is processed by the reproduced signal processing means 18. The reproduced signal processing means 18 carries out a reproduced signal processing by using the first storing means 19. The reproduced signal processing includes processings of, for example, error correcting, deinterleaving, highly efficient decoding or the like. An output signal 38 outputted from the reproduced signal processing means 18 is monitored so that whether the recording of the VTR is properly carried out or not can be recognized.

In the above mentioned construction of the digital VTR as the signal processing apparatus, it is assumed that all the delay time T from the input signal 34 to the output signal 38 is expressed by $T=2\times N\times F$ (herein, N>0, N is an integer and F is time corresponding to a period of one frame of an image signal). In the case of the progressive scanning signal, the frequency of one frame period is 60 Hz. Since the recording head 32 and the simultaneous reproducing head 31 are circumferentially separated by 90° from each other in the arrangement of the heads shown in FIG. 10, a delay time due to the difference in physical position for attachment between the recording head 32 and the simultaneous reproducing head 31 is half of a head switch period. If the track pattern shows a pattern as illustrated in FIG. 9, it is assumed that the total of the delay time (namely, a half of the head switch period) due to the difference in physical position for attachment between the recording head 32 and the simultaneous reproducing head 31, a delay in the recording signal processing means 22 and a delay in the reproduced signal processing means 18 is all the delay time T and T is expressed by 2×N×F (herein N>0, N is an integer and F designates time corresponding to a period of one frame of an image signal). Thus, in the simultaneously reproduced output signal 38, the main signal is not replaced by the sub-signal, so that the qualities of images of the color difference signals are not lowered.

Although, in the above sixth embodiment of the invention, the simultaneous reproduction in the VTR has been described, it is to be understood that a signal (referred to as an EE signal) which is outputted after it does not pass through a tape head system but only passes through a signal processing system may realize the same effect as mentioned above.

As stated above, even when an output signal which is outputted in the form of, for instance, 420P signal is inputted to a device in a succeeding stage in a multistage connection during a simultaneous reproduction or an EE signal, and then, the color difference signals thereof are interpolated in the device in the succeeding stage, the qualities of image of the color difference signals are not deteriorated. Further, even when the color difference signals are interpolated in the signal processing apparatus and the inputted signal is outputted as an 8:4:4: signal or a 4:2:2:4:2:2 signal, the qualities of images of the color difference signals are not lowered.

Now, a seventh embodiment of the present invention will be described by referring to FIGS. 11 to 14.

Figure 11:
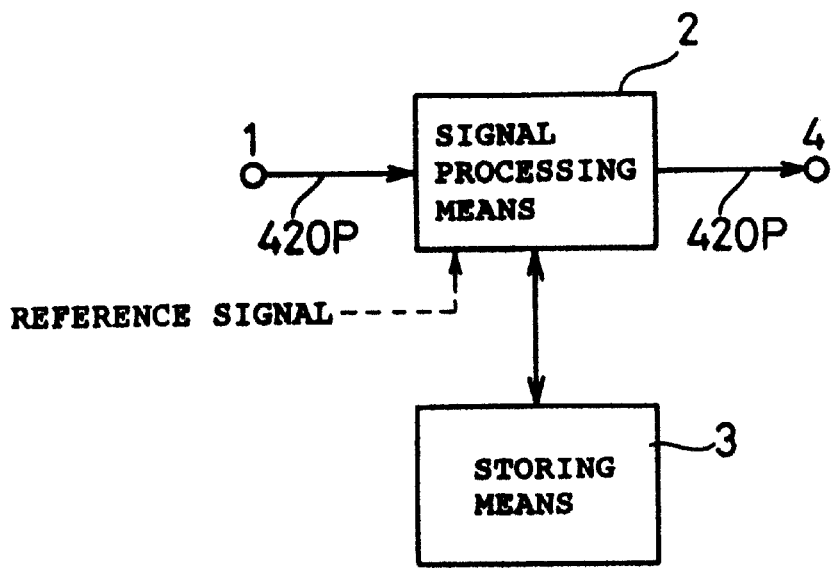
FIG. 11 is a block diagram showing the constitution of a progressive scanned signal processing apparatus according to a seventh embodiment of the present invention.

FIG. 11 is a block diagram showing the construction of a progressive scanned signal processing apparatus according to a seventh embodiment of the present invention and illustrates the constitution of the signal processing apparatus applied to a device for processing progressive scanned image signals such as an editing device, a switcher, a VTR and so on.

Figure 12:
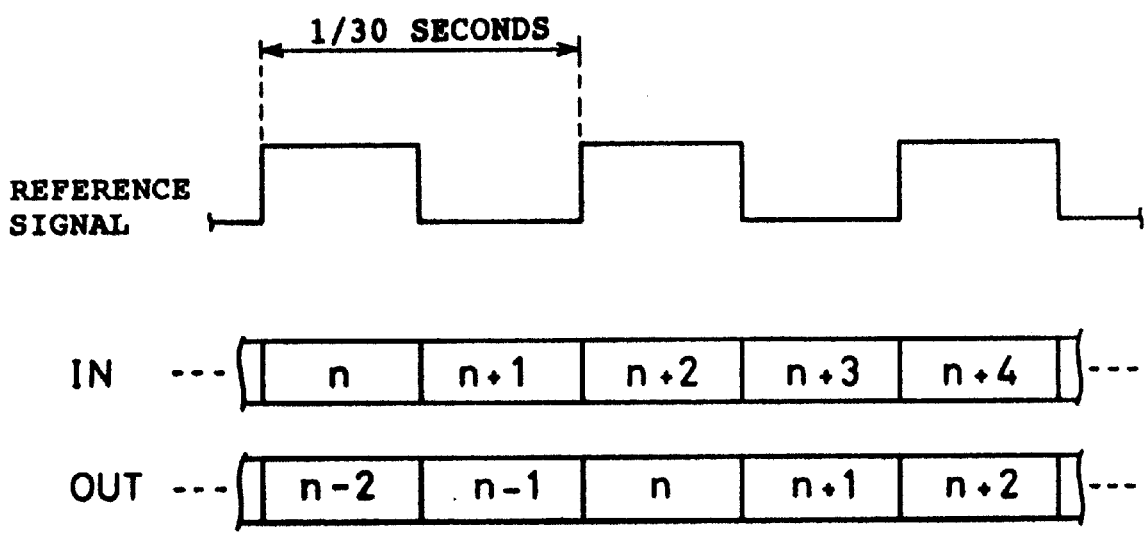
FIG. 12 is a schematic view showing the relation of delay in the frames of input and output signals relative to a reference signal in the signal processing apparatus according to the seventh embodiment of the present invention.

In FIG. 11, an image signal in a 420P form is inputted to the signal processing apparatus as an input signal 1. A signal processing means 2 processes the input signal 1 by using a storing means 3 and outputs the signal as an output signal 4 in the 420P signal form. Further, a reference signal having a period of 1/30 seconds is inputted to the signal processing means 2. One frame of the image signal is inputted to and outputted from the signal processing means 2 based on ON/OFF or turning on/off of the reference signal. As illustrated in FIG. 12, an input timing is synchronized with an output timing so that the image signal outputted from the signal processing means 2 is delayed by two frames from the image signal inputted to the signal processing means 2.

In this connection, if the image signal of a frame n is inputted to the signal processing means 2 as the input signal 1, the image signal of a frame (n−2) which is delayed by two frames from the former is outputted from the signal processing means 2 as the output signal 4. Therefore, a main signal is not replaced by a sub-signal. Even when color difference signals are repeatedly decimated or interpolated, the qualities of images of the color difference signals are not deteriorated.

Figure 13:
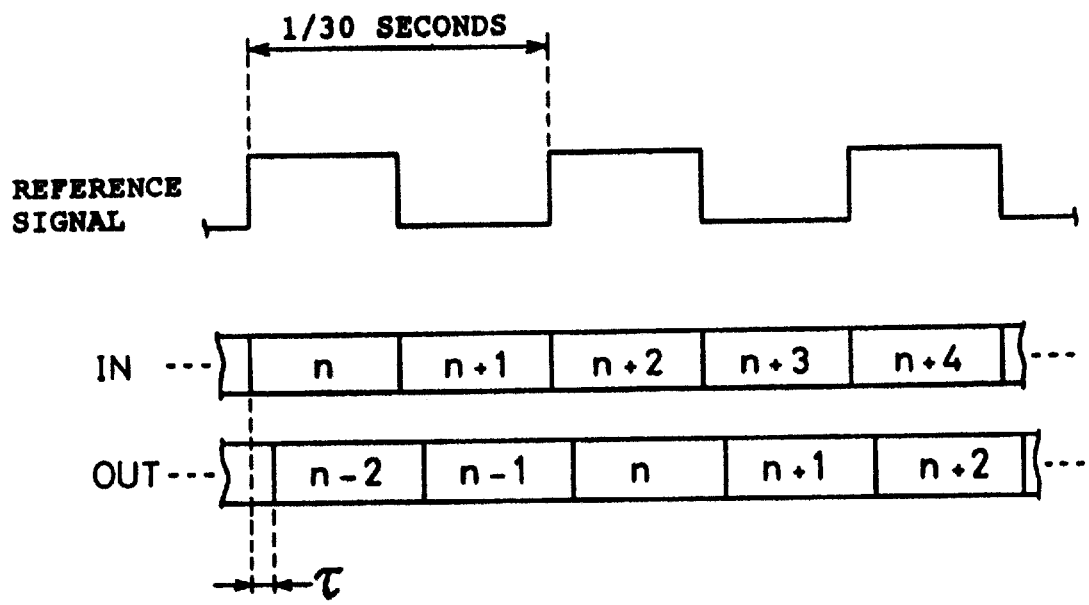
FIG. 13 is a schematic view showing the relation of delay including errors in the frames of input and output signals relative to a reference signal in the signal processing apparatus according to the seventh embodiment of the present invention.
Figure 14:
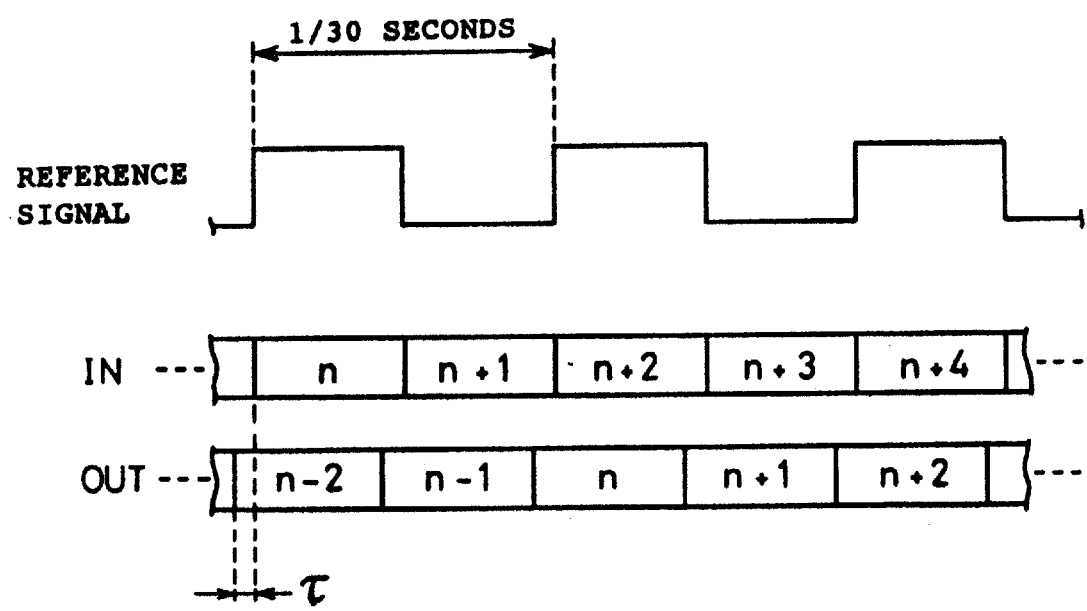
FIG. 14 is a schematic view showing the relation of delay including errors in the frames of input and output signals relative to a reference signal in the signal processing apparatus according to the seventh embodiment of the present invention.
Figure 15:
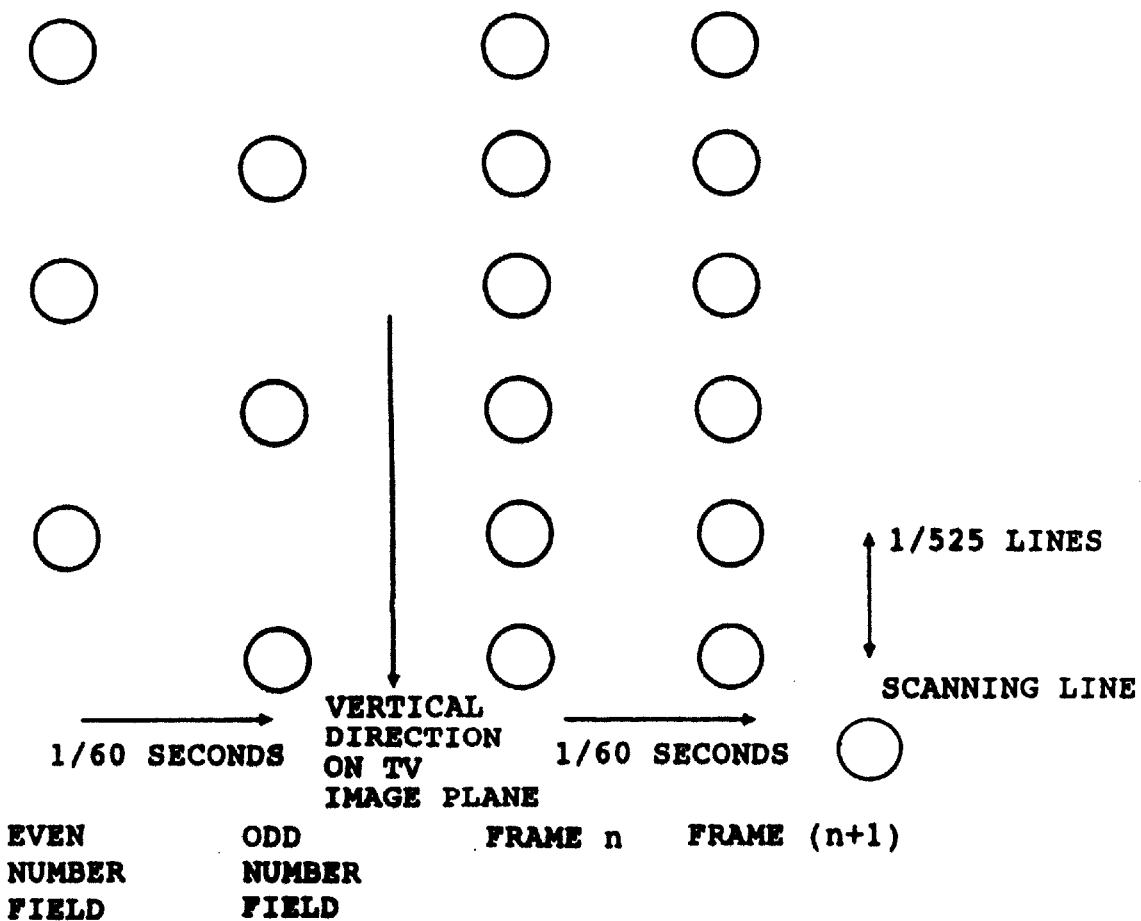

Although, in the above seventh embodiment of the present invention, the output timing of the image signal is precisely delayed by two frames from the input timing thereof, as shown in FIG. 12, a delay time may involve a little error when the input and output timings are set with the delay of two frames therebetween, as shown in FIGS. 13 and 14.

Parenthetically, although, in the above described embodiments, an example in the digital VTR has been described, it is to be recognized that the present invention is not limited to the digital VTR, and may be applied to a device for recording and reproducing 420P signals, such as an optical disk or the like.

What is claimed is:

1. A progressive scanned signal processing apparatus in which progressive scanned image signals or image signals obtained by vertically decimating color difference signals of the progressive scanned image signals for every one line comprising 420P signals are taken as inputs and processed based on a 420P signal form, said progressive scanned signal processing apparatus comprising:

a signal processing device; and a storing device, said signal processing device carrying out signal processing using said storing device, said signal processing requiring a time of 2×N×F, where N>0, N is an integer and F represents a time corresponding to a period of one frame of an image signal.

2. A progressive scanned signal processing apparatus according to claim 1, further comprising a color difference signal decimating device provided on an input side of the signal processing device for vertically decimating the color difference signals of the progressive scanned image signals for every one line, wherein a total time required for decimating processing by the color difference signal decimating device and the time required for the signal processing by the signal processing device using the storing means is 2×N×F.

3. A progressive scanned signal processing apparatus according to claim 1, further comprising a color difference signal interpolating device provided on an output side of the signal processing device for interpolating the decimated color difference signals, wherein a total of the time required for the signal processing by the signal processing device using the storing device and a time required for interpolating processing by the color difference signal interpolating device is 2×N×F.

4. A progressive scanned signal processing apparatus according to claim 1, further comprising a color difference signal decimating device provided on an input side of the signal processing device for vertically decimating the color difference signals of the progressive scanned image signals for every one line, and a color difference signal interpolating device provided on an output side of the signal processing device for interpolating the decimated color difference signals, wherein a total time required for decimating processing by the color difference signal decimating device, the time required for signal processing by the signal processing device using the storing device and a time required for interpolating processing by the color difference signal interpolating device is 2×N×F.

5. A progressive scanned signal processing apparatus in which progressive scanned image signals or image signals obtained by vertically decimating color difference signals of the progressive scanned image signals for every one line comprising 420P signals are taken as inputs, and recorded and reproduced as the 420P signals, said progressive scanned signal processing apparatus comprising:

a leading reproducing device;

a reproduced signal processing device;

a first storing device;

a recording signal processing device;

a second storing device; and a recording device, said leading reproducing device reproducing data at a position preceding in terms of time;

said reproduced signal processing device performing reproduced signal processing by using said first storing device to output image signals;

said recording signal processing device performing recording signal processing by using said second storing device with the output image signals being reinputted signals;

said recording device simultaneously recording the processed image signals;

wherein a total of a delay time due to a difference in physical position between the recording device and the leading reproducing device, a delay time caused by the leading reproducing device, a time required for reproduced signal processing by the reproduced signal processing device, a time required for recording signal processing by the recording signal processing device, and a delay time caused by the recording device is $2 \times N \times F$, where $N>0$, N is an integer and F represents time required for a period of one frame.

6. A progressive scanned signal processing apparatus in which progressive scanned image signals or image signals obtained by vertically decimating color difference signals of the progressive scanned image signals for every one line comprising 420P signals are taken as inputs, and recorded and reproduced as the 420P signals, said progressive scanned signal processing apparatus comprising:

a recording signal processing device;

a second storing device;

a recording device;

a simultaneous reproducing device;

a reproduced signal processing device; and a first storing device;

said recording signal processing device performing recording signal processing of the input signals by using the second storing device;

said recording device recording the signals simultaneously at the same time said simultaneous reproducing device reproduces the signals;

said reproduced signal processing device performing reproduced signal processing by using the first storing device to output the image signals, wherein a total delay time due to a difference in physical position between the recording device and the reproducing device, a time required for recording signal processing by the recording signal processing device, a delay time caused by the recording device, a delay time caused by the simultaneous reproducing device, and a time required for reproduced signal processing by the reproduced signal processing device is $2 \times N \times F$, where $N>0$, N is an integer and F represents time required for one frame.

7. A progressive scanned signal processing apparatus in which progressive scanned image signals or image signals obtained by vertically decimating color difference signals of the progressive scanned image signals for every one line comprising 420P signals are taken as inputs and processed based on a 420P signal form, said progressive scanned signal processing apparatus comprising:

a signal processing device; and a storing device;

said signal processing device being adapted such that the image signals are inputted thereto, processed therein by using the storing device, and output therefrom with a predetermined amount of delay, wherein the image signals output from the signal processing device are synchronized with those input to the signal processing device in such a fashion as to be delayed only by an even number of frames relative to the image signals input to the signal processing device.

* * * * *